(12) United States Patent
Eckard et al.

(10) Patent No.: US 10,107,433 B2
(45) Date of Patent: Oct. 23, 2018

(54) QUICK CONNECTOR ASSEMBLY AND METHOD OF ESTABLISHING AND ENSURING A FLUID-TIGHT CONNECTION BETWEEN CONDUITS

(71) Applicant: Miniature Precision Components, Inc., Walworth, WI (US)

(72) Inventors: Duane Eckard, Loves Park, IL (US); Umashanker Natarajan, Walworth, WI (US); Brian Champion, Prairie du Chien, WI (US); Michael Longhenry, Walworth, WI (US)

(73) Assignee: MINIATURE PRECISION COMPONENTS, INC., Walworth, WI (US)

( * ) Notice: Subject to any disclaimer, the term of this patent is extended or adjusted under 35 U.S.C. 154(b) by 255 days.

(21) Appl. No.: 15/091,218

(22) Filed: Apr. 5, 2016

(65) Prior Publication Data

US 2017/0284583 A1    Oct. 5, 2017

(51) Int. Cl.
| | |
|---|---|
| *F16L 37/10* | (2006.01) |
| *F16L 37/098* | (2006.01) |
| *B60K 15/01* | (2006.01) |

(52) U.S. Cl.
CPC ............ *F16L 37/101* (2013.01); *B60K 15/01* (2013.01); *F16L 37/0985* (2013.01); *F16L 2201/10* (2013.01)

(58) Field of Classification Search
CPC . F16L 37/098; F16L 37/0982; F16L 37/0985; F16L 37/101; F16L 2201/10; B60K 15/01
USPC .................................................... 285/93, 319
See application file for complete search history.

(56) References Cited

U.S. PATENT DOCUMENTS

| | | | |
|---|---|---|---|
| 5,441,313 A * | 8/1995 | Kalahasthy | ......... F16L 37/0982 285/93 |
| 5,947,531 A | 9/1999 | Eckard et al. | |
| 2008/0136163 A1* | 6/2008 | Okada | .......................... 285/93 X |
| 2014/0284915 A1* | 9/2014 | Arnold | ................ F16L 37/0982 |

* cited by examiner

*Primary Examiner* — Greg Binda
*Assistant Examiner* — Zachary T Dragicevich
(74) *Attorney, Agent, or Firm* — Dickinson Wright PLLC

(57) ABSTRACT

A connector assembly and method of making and ensuring a reliable, fluid-tight connection, the assembly includes a housing a having a wall bounding a bore extending along a central longitudinal axis. The wall has a locking opening, a slot, and a window. A retaining member has a cylindrical wall received in the bore of the housing. The cylindrical wall has a detent received in the locking opening and a locking arm cantilevered by a hinge connection for pivotal movement. The locking arm is spaced from the cylindrical wall by a gap and is received in the slot when the detent is received in the locking opening. A visual indicator attached to the cylindrical wall moves radially outwardly into the window in response to the collar being fully received in the gap to provide visual evidence of a fluid-tight seal between the insertion member and the housing.

17 Claims, 9 Drawing Sheets

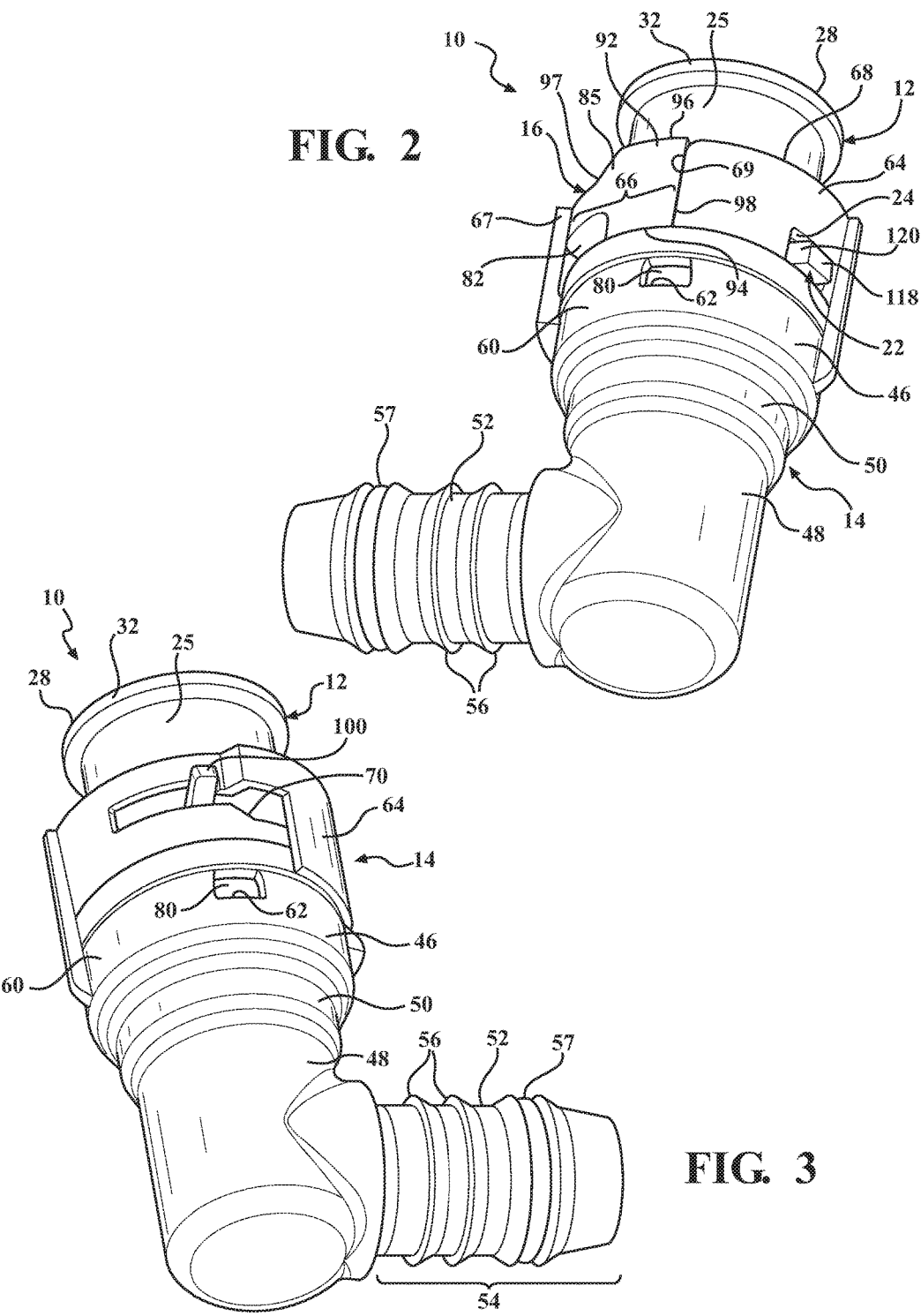

QUICK CONNECTOR ASSEMBLY AND METHOD OF ESTABLISHING AND ENSURING A FLUID-TIGHT CONNECTION BETWEEN CONDUITS

BACKGROUND OF THE INVENTION

Field of the Invention

The present disclosure relates generally to a quick connector assembly for establishing a fluid-tight union between fluid conduits, and more particularly to a quick connector assembly for securing an insertion member within a receiving member to convey fluids therethrough.

Related Art

This section provides background information related to the present disclosure which is not necessarily prior art.

As is well known, a type of coupling, commonly referred to as a "quick connector," is used to quickly and simply connecting tubes or conduits to one another. Quick connector assemblies connect an insertion member to a receiving member to convey fluids therethrough in a variety of liquid and gas systems to provide a connection between a pair of components for establishing a continuous flow path therebetween. For example, in automotive applications, quick connectors are used in various air/vapor management systems such as evaporative emissions systems, crankcase ventilation systems, and brake boost and engine vacuum systems. In addition to these gas management systems, quick connectors can also be used in fluid delivery systems such as, for example, liquid fuel and windshield washer applications. The benefits of quick connectors in automotive applications include their intended ease of assembly and subsequent replacement, a reduction in the number of leak paths, a reduction in the number of system components, and the containment of hydrocarbon emissions.

Despite the increasing opportunity to use quick connectors in motor vehicle gas management and liquid delivery systems, a need still exists to provide a superior, reliable mounting arrangement between one of the male and female connector components, typically the male port connector, and its adjoining wall structure. A further need exists to ensure the connection is made as intended, to avoid an unwanted leaking between the connected members after assembly and while in use. Ideally, this would be accomplished by providing a mounting arrangement that is quick to assemble and reduces fabrication complexity and permits modular connection of a wide variety of connectors.

SUMMARY OF THE INVENTION

This section provides a general summary of the disclosure and is not intended to represent a comprehensive summary of all of its features, advantages, aspect and/or objectives.

It is an aspect of the present disclosure to provide a quick and reliable mechanism and method in which to ensure a reliable, fluid-tight seal has been established between a plurality of components of a quick connector used to form a fluid-tight connection between conduits. The mechanism and method include providing visual evidence that such a reliable, fluid-tight connection has been made, thereby facilitating the ability to inspect the fluid-tight connection has been established, even in relatively noisy environments, such as encountered in many manufacturing facilities.

A connector assembly for receiving a tubular male insertion member having a radially outwardly extending annular collar located between opposite ends to facilitate establishing a fluid-tight connection between fluid conduits is provided. The connector assembly, constructed in accordance with one aspect of the invention, includes a housing a having a tubular wall bounding a bore extending along a central longitudinal axis between opposite ends of the housing. The wall has at least one locking opening, a slot, and a window. The connector assembly further includes a retaining member having a cylindrical wall sized for receipt in the bore of the housing. The cylindrical wall has at least one detent extending radially outwardly from the cylindrical wall for receipt in the at least one locking opening. The cylindrical wall also has a locking arm cantilevered therefrom by a hinge connection allowing pivotal movement of the locking arm radially inwardly and outwardly from the central longitudinal axis. The locking arm is axially spaced from the cylindrical wall by a gap sized for receipt of the collar when the tubular male insertion member is in a fully assembled position relative to the housing. The locking arm is configured for receipt in the slot when the at least one detent is received in the at least one locking opening. A visual indicator is flexibly attached to the cylindrical wall. The visual indicator is moveable from an unbiased position to a radially outwardly, resiliently biased position away from the central longitudinal axis into the window in response to the collar being fully received in the gap in radially aligned abutment with the visual indicator. As such, visual evidence is provided that the male insertion member is properly and completely assembled in a fluid-tight fashion with the housing.

In accordance with another aspect of the invention, the visual indicator can be provided having an elongate body extending between opposite ends, with one end of the body being attached to the retainer member by a hinged connection and the opposite end of the body being attached to a visual indicator lobe. The visual indicator lobe can be provided with a cam surface configured for sliding engagement with the collar to facilitate movement of the collar into radially aligned abutment with the visual indicator.

In accordance with another aspect of the invention, at least a portion of the visual indicator lobe can be provided to extend radially outwardly from the tubular wall of the housing when the collar is in radially aligned abutment with the visual indicator, thereby facilitating visual and/or physical inspection of the attainment of a proper, fluid-tight connection.

In accordance with another aspect of the invention, the visual indicator lobe can be configured to remain recessed radially inwardly from an outer surface of the tubular wall of the housing when the collar is not fully received in the space, thereby acting to serve as an indicator that a less than complete assembly has been established, and thus, a fluid-leak condition may exist.

In accordance with another aspect of the invention, the elongate body and the indicator lobe can be spaced from the cylindrical wall by a gap to enhance the flexible resiliency of the visual indicator.

In accordance with another aspect of the invention, the housing can be provided with a first portion, a second portion and a third portion spaced axially from one another, with the third portion extending axially between the first and second portions, and the at least one locking opening and the slot being formed in the first portion and the window being formed in the third portion.

In accordance with another aspect of the invention, at least one seal member can be disposed in the second portion, with the at least one seal member being adapted for direct sealed abutment with an outer surface of the tubular male insertion member to facilitate forming a fluid-tight seal therebetween.

It is another aspect of the present disclosure to provide a method of making and visually ensuring a reliable connection is made between an insertion member and a receiving member.

A method of making and ensuring a reliable, fluid-tight connection is established between separate components of a connector assembly used for connection of fluid conduits to one another, in accordance with one aspect of the invention, includes: providing a tubular male insertion member having a radially outwardly extending annular collar located between opposite ends; providing a housing a having a tubular wall bounding a bore extending along a central longitudinal axis between opposite ends of the housing, with the wall having at least one locking opening, a slot, and a window; providing a retaining member having a cylindrical wall including at least one detent extending radially outwardly from the cylindrical wall, having a locking arm cantilevered from the cylindrical wall by a hinge connection and being axially spaced from the cylindrical wall by a gap, and having a visual indicator flexibly attached to the cylindrical wall; compressing the locking arm radially inwardly and inserting the retaining member into the bore of the housing along the central longitudinal axis and bringing the at least one detent into snapped, locked engagement into the at least one locking opening and releasing the locking arm to allow the locking arm to spring resiliently radially outwardly into the slot; inserting a portion of the tubular male insertion member axially through the retaining member along the central longitudinal axis and resiliently biasing the locking arm radially outwardly with the collar until the collar extends beyond the locking arm into full receipt in the gap; and, engaging the visual indicator with the collar and causing the visual indicator to be resiliently biased radially outwardly into the window when the collar is fully received in the gap, whereupon the visual indicator serves to indicate a fully assembled, fluid-tight connection has been made between the tubular male insertion member and the housing.

In accordance with another aspect of the invention, the method can further include causing the visual indicator to extend radially outwardly from an outer surface of the housing when the collar is fully received in the gap, thereby providing enhanced visual and physical evidence for inspection indicating a fluid-tight, fully assembled condition exists between the tubular male insertion member and the housing.

In accordance with another aspect of the invention, the method can further include sliding the collar along a cam surface of the visual indicator to facilitate biasing the visual indicator radially outwardly into the window.

In accordance with another aspect of the invention, the method can further include causing the visual indicator to remain substantially unbiased and recessed radially inwardly from an outer surface of the tubular wall of the housing when the collar is not fully received in the gap to indicate an incomplete assembled state between the tubular male insertion member and the housing.

Further areas of applicability of the present invention will become apparent from the description and illustrations provided herein. The description and specific examples in this summary are intended for purposes of illustration only and are not intended to limit the scope of the present disclosure.

BRIEF DESCRIPTION OF THE DRAWINGS

These and other aspects, features and advantages of the invention will become more readily appreciated when considered in connection with the following detailed description, appended claims and accompanying drawings, in which:

FIG. 2 is an assembled perspective view looking toward one side of the quick connector assembly of FIG. 1;

FIG. 3 is view similar to FIG. 2 looking at an opposite side of the quick connector assembly;

DETAILED DESCRIPTION OF PRESENTLY PREFERRED EMBODIMENTS

Referring in general to all of the figures, the present disclosure and teachings described herein are directed to quick connector assemblies, of the type particularly well-suited for providing a fluid tight union between conduits. While disclosed in accordance with one or more specific exemplary constructions, a quick connector assembly 10 of the present disclosure may be configured other than as expressly shown and described. The inventive concepts disclosed are generally directed to an improved mechanism for forming and ensuring a reliable, fluid-tight connection is made between a male insertion member 12 and a receiving member, also referred to as housing 14, via an intermediate retainer, also referred to as retaining member 16, and to a method of forming and ensuring a reliable, fluid-tight connection is made between the male insertion member 12 and the housing 14 of the quick connector assembly 10. The improved quick connector assembly 10 and method of forming a reliable, fluid-tight connection is economical in manufacture and provides a quick, reliable way in which to ensure a fluid-tight connection is established between the male insertion member 12 and the housing 14 via the retaining member 16.

Figure 5A:
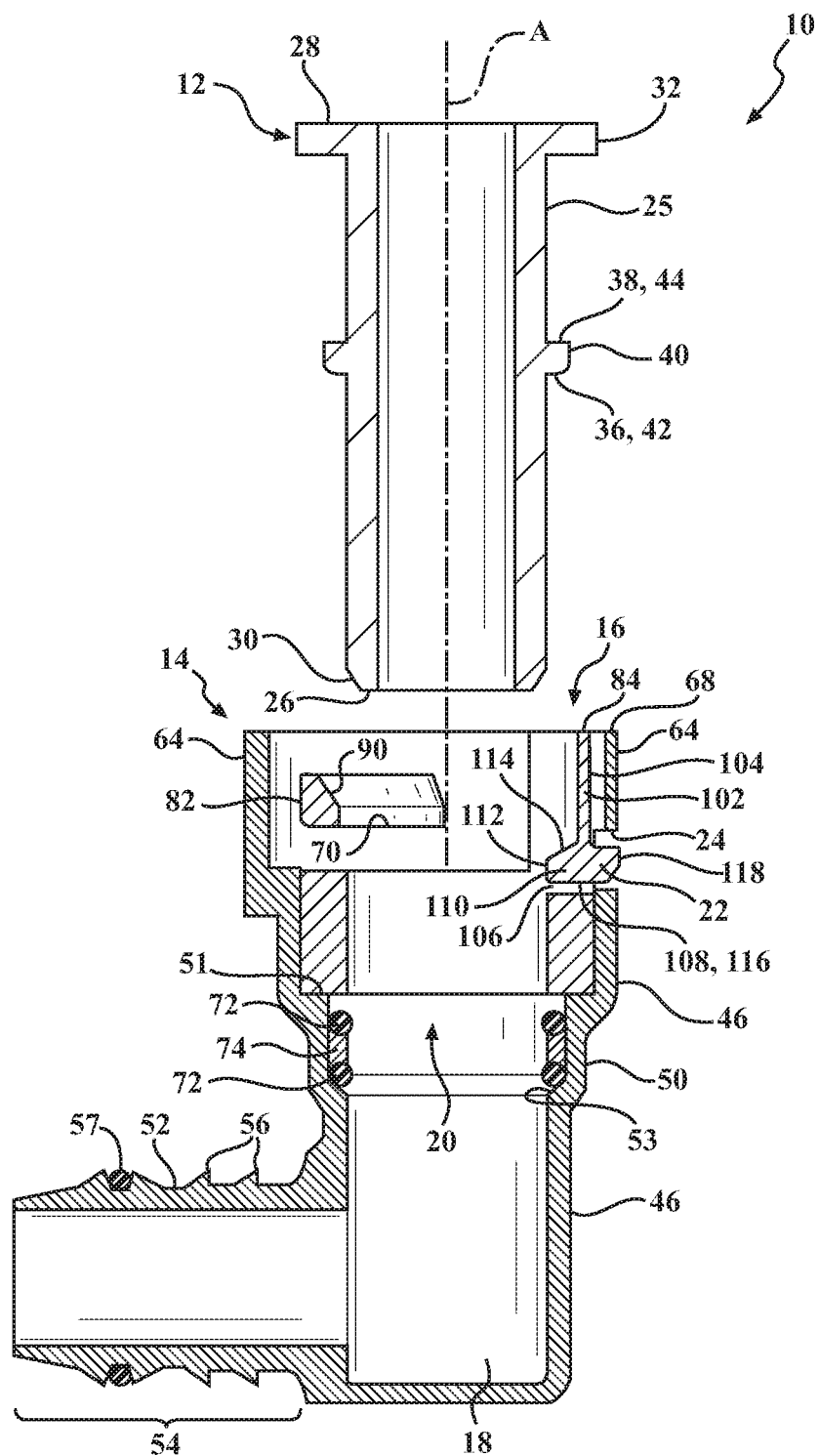
FIG. 5A is a cross-sectional view taken through a visual indicator lobe in radially spaced relation from a longitudinal central axis of the quick connector as shown in FIG. 4A.
Figure 5B:
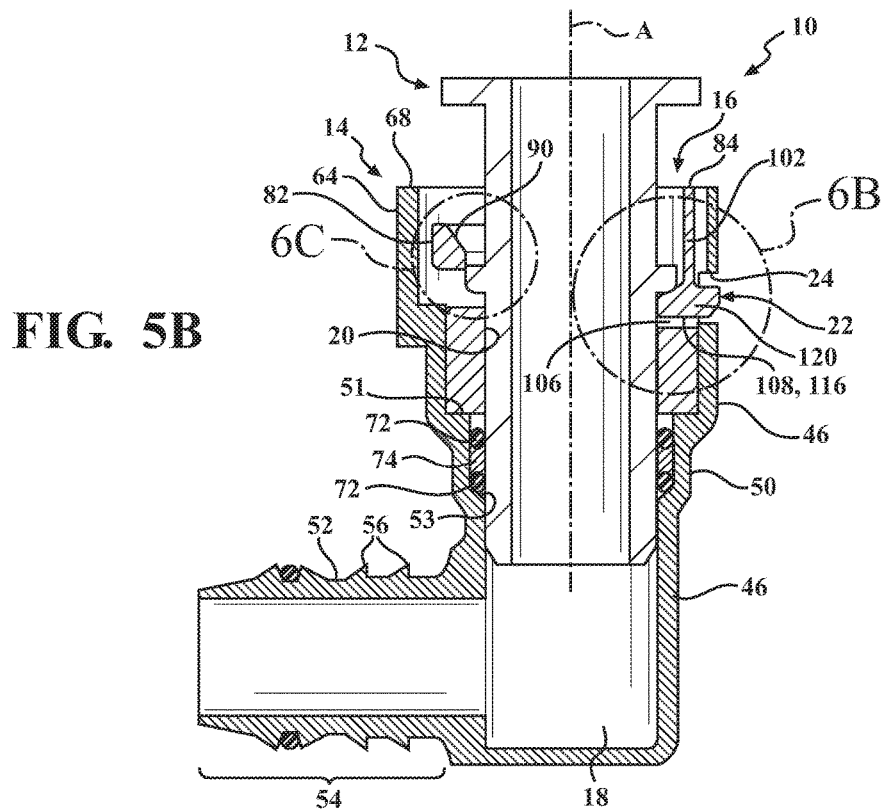
FIG. 5B is a cross-sectional view taken through a visual indicator lobe in radially spaced relation from a longitudinal central axis of the quick connector as shown in FIG. 4B.
Figure 5C:
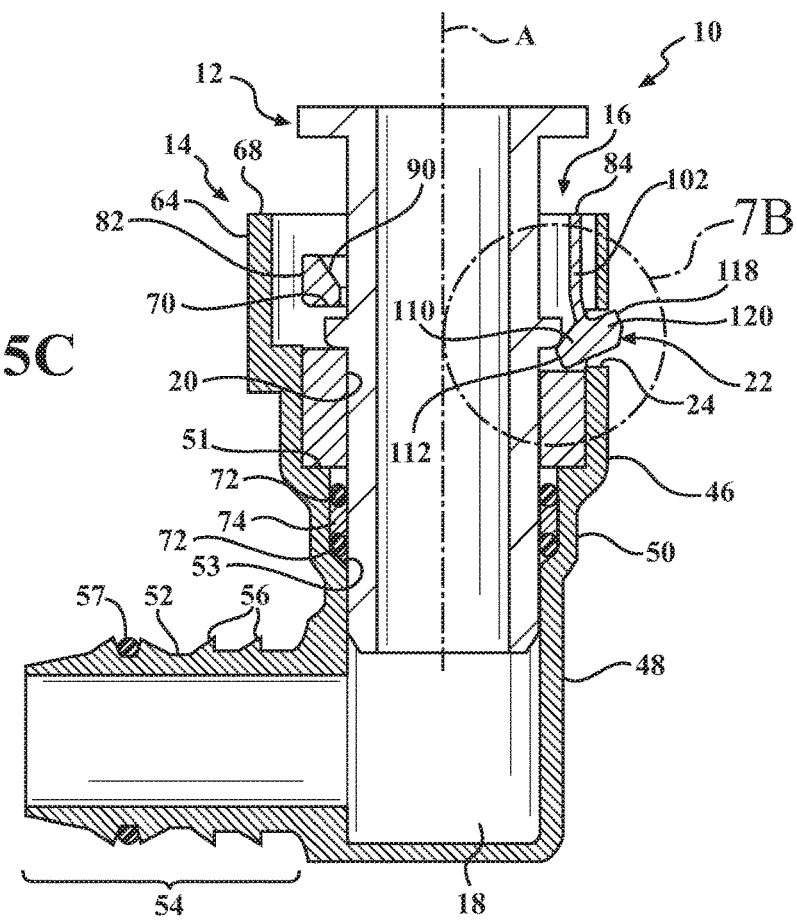
FIG. 5C is a cross-sectional view taken through a visual indicator lobe in radially spaced relation from a longitudinal central axis of the quick connector as shown in FIG. 4C.

During assembly, as shown in FIGS. 5A-5C, the retaining member 16 is inserted axially along a longitudinal axis A of the assembly 10, which corresponds to a longitudinal axis of the individual components 12, 14, 16, within an axially extending bore 18 bounded by a generally cylindrical, generally tubular wall 19 of the housing 14. Upon inserting the retaining member 16 into the housing bore 18, the retaining member 16 becomes automatically fixed therein as a result of interlocking features, discussed in more detail below. Then, the insertion member 12 is inserted along the longitudinal axis A into the bore 18 of the housing 14 and through a bore, also referred to as through opening 20, of the retaining member 16. Upon inserting the insertion member 12 into the housing bore 18 and through the retaining member through opening 20 to a fully assembled state, whereupon a fluid-tight seal is perfected between the insertion member 12 and the housing 14, aside from an generally audible "snap" or "click" noise indicating full assembly has occurred, a protrusion, also referred to as visual indicator 22, is automatically visible through an opening, also referred to as window 24, of the housing 14. It is only when full assembly has occurred between the insertion member 12 and the housing 14, thereby assuring a fluid-tight seal has been perfected, that the visual indicator 22 extends through the window 24 to indicate the fully assembled state has occurred. Accordingly, during assembly, an efficient, reliable mechanism is provided to audibly and visually indicate proper and complete assembly has occurred between the insertion member 12 and the housing 14, thereby avoiding any possibility of inadvertent leaks within the assembly 10 as a result of incomplete assembly. Of course, it is to be recognized that visual inspection of the visual indicator 22 may be manual, via direct inspection by a person, or otherwise, such that inspection may be automated via a camera inspection system in real-time. Further yet, given the visual indicator 22 can be provided to extend radially outwardly from the window 24, a physical inspection, whether manual, such as by hand, or automated, such as via physical sensors, proximity sensors or various types of gauges, could be used to verify full assembly has been attained.

The insertion member 12 includes a tubular shaft portion 25 that extends between opposite ends, with one end being an insertion end 26 and the opposite end being an attachment end 28 configured for operable attachment to a conduit (not shown). The insertion end 26 is shown as having a radiused lead-in surface in the form of a generally rounded nose 30 that generally tapers or reduces in diameter to the insertion end 26. The attachment end 28 is shown as having an annular, radially outwardly extending flange 32. The insertion member 12 further includes an assembly feature in the form of an annular collar 34 between the opposite ends 26, 28. The annular collar 34 extends radially outwardly from the shaft portion 25 and is shown as being generally rectilinear in cross-section, though it is anticipated that the configuration could be different. The annular collar 34 has a radially outwardly extending, annular leading shoulder 36 and a radially outwardly extending, annular trailing shoulder 38 spaced from one another by an axially extending outer periphery 40. The leading shoulder 36 is shown as merging with the outer periphery 40 via a slightly rounded annular profile or corner 42, such that the corner 42 transitions the shoulder 36 in smooth arcuate fashion with the outer periphery. In contrast, the trailing shoulder 38 and the outer periphery 40 are shown as merging with one another at a generally sharp or square corner 44. The insertion member 12, as described, is a male conduit member and may be constructed from any desired material known in the art, including plastics, metals, or otherwise, wherein the insertion member 12 in one exemplary embodiment is a resinous tube.

The housing 14, as best shown in FIGS. 1-4, includes coaxial, generally cylindrical portions forming at least a portion of the bore 18 that extends along the longitudinal axis A, and a portion branched off in generally transverse relation to the axis A, thereby rendering the housing 14 generally L-shaped, by way of example and without limitation. The coaxial portions include an enlarged diameter first cylindrical receiving portion 46, a reduced diameter second cylindrical portion 48, with a stepped intermediate diameter third cylindrical portion 50 extending between the first and second cylindrical portions 46, 48, wherein, as best shown in FIGS. 5A-5C, an annular upper shoulder 51 separates the upper first cylindrical receiving portion 46 from the intermediate third cylindrical portion 50 and an annular lower shoulder 53 separates the lower second cylindrical portion 48 from the intermediate third cylindrical portion 50. As such, the relative diameters are such that the first diameter is greater than the second and third diameter, and the third diameter is greater than the second diameter: D1>D3>D2. A branched portion 52 extends generally transversely from the second portion 48 to form an end nipple portion, also referred to as coupling portion 54, shown as having a plurality of consecutive annular ridges 56 along its outer periphery for operable attachment to a conduit (not shown) and an O-ring 57 to facilitate forming a fluid-tight seal. The enlarged diameter receiving portion 46 has an open end 58 and a circumferentially continuous cylindrical wall 60. The cylindrical wall 60 has at least one, and shown as a plurality (two, by way of example and without limitation) of circumferentially spaced, diametrically opposite locking grooves or through openings 62. The enlarged diameter portion 46 further includes a circumferentially discontinuous extension portion 64 extending upwardly axially along the axis A from the circumferentially continuous cylindrical wall 60. The extension portion 64 has an open notched region 66 bounded by axially extending side edges 67, 69 extending from a free end 68 axially along the extension portion 64 generally to the cylindrical wall 60, wherein the notched region 66 is sized for axial receipt of a portion of the retaining member 16, discussed further hereafter. The extension portion 64 further includes a peripherally bounded elongate slot 70 generally opposite the notched region 66. The slot 70 extends lengthwise in a circumferential direction along an arced segment of the extension portion 64. The extension portion 64 further yet includes the window 24, which is shown, by way of example and without limitation, as being formed generally between the notched region 66 and the slot 70 along a side of the extension portion 64 facing away from the branched portion 52. The window 24 is further shown as being spaced slightly axially from the slot 70 in a direction toward the cylindrical wall 60.

The intermediate third cylindrical portion 50 is sized diametrically and axially to receive at least one elastomeric annular seal member and shown as a pair of elastomeric O-rings 72. One of the O-rings 72 is shown as being seated against the lower shoulder portion 53 with an annular cylindrical spacer sleeve 74 being seated there against, with the other of the O-rings 72 being seated on an opposite side of the spacer sleeve 74. Accordingly, the spacer sleeve 74 extends between the oppositely disposed O-rings 72, all being confined within the intermediate diameter portion 50. It should be recognized the seal member could be configured other than as described and shown, as long a fluid-tight seal is formed thereby against the tubular shaft portion 25 of the insertion member 12 upon assembly and while in use.

Figure 1:
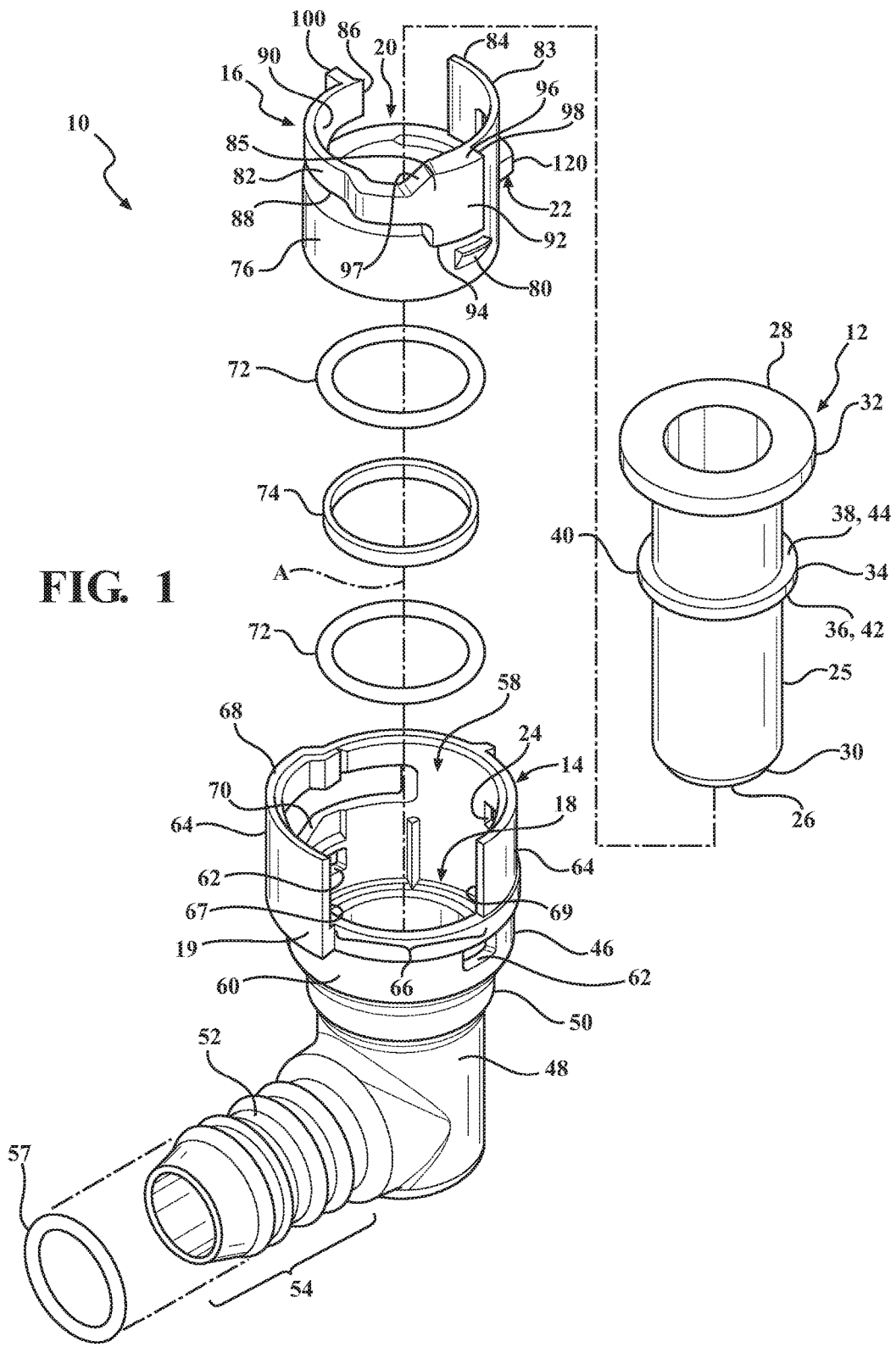
FIG. 1 is an exploded perspective view looking toward one side of a quick connector assembly shown constructed in accordance with one aspect of the invention.
Figure 4A:
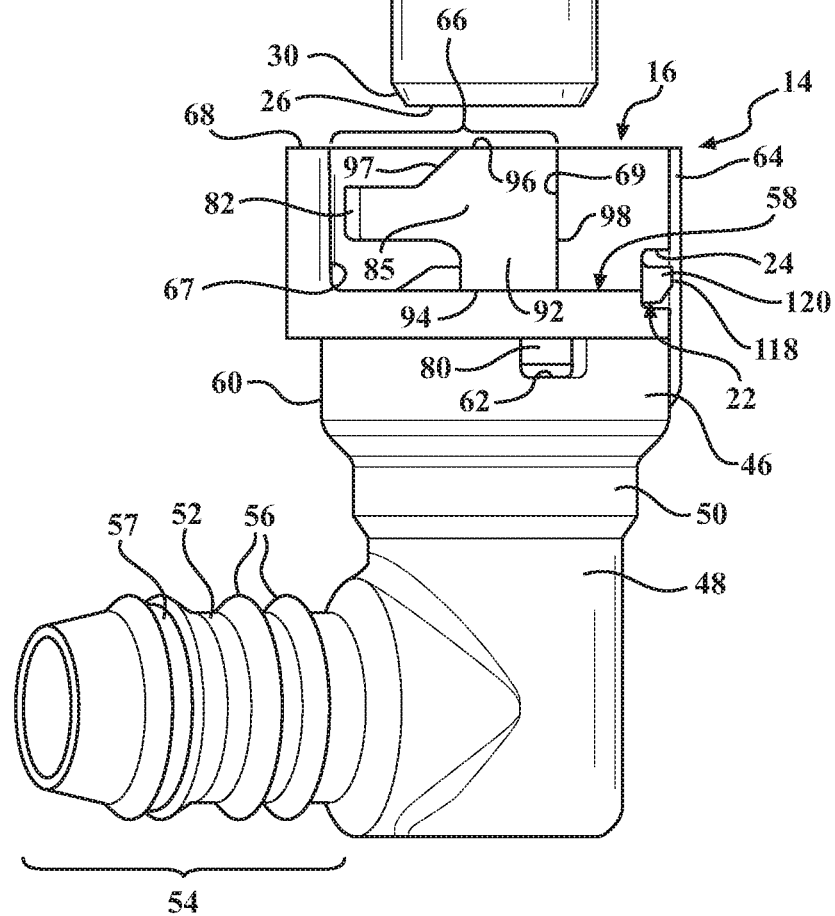
FIG. 4A is a side view of the quick connector of FIG. 1 with an insertion member of the assembly shown removed therefrom.
Figure 4B:
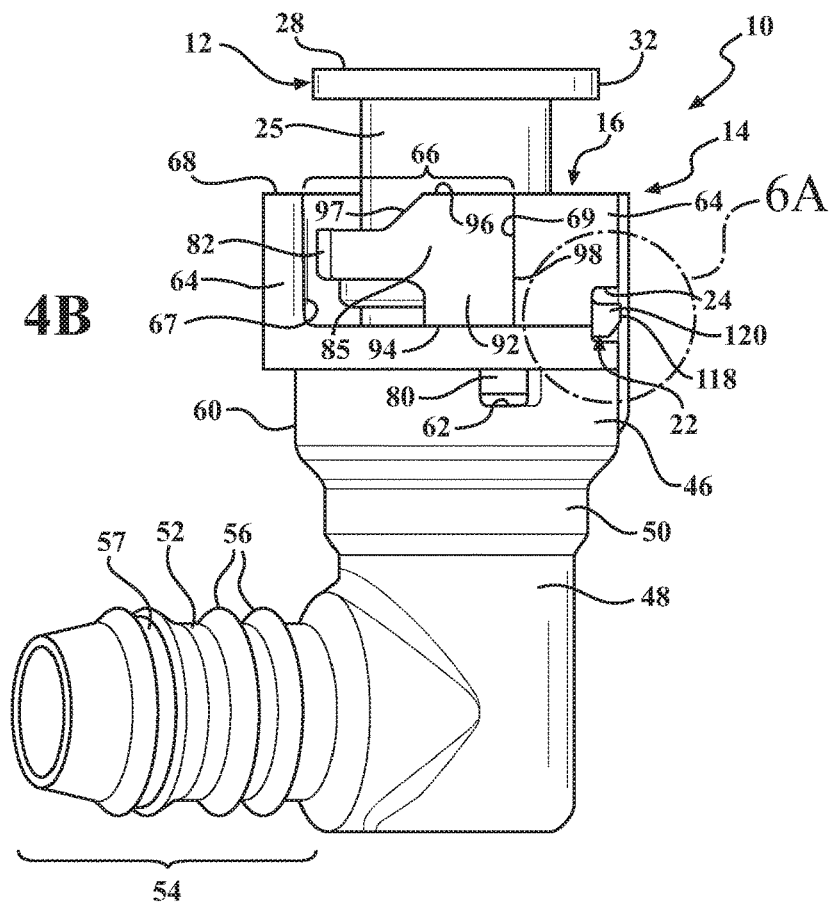
FIG. 4B is a view similar to FIG. 4A with the insertion member of the assembly shown partially inserted therein to a position less than fully assembled.
Figure 6A:
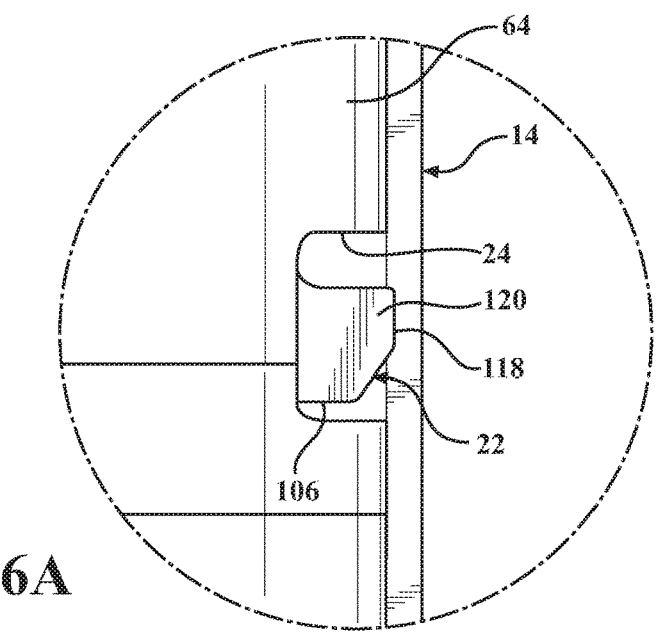
FIG. 6A is an enlarged fragmentary view of the encircled area 6A of FIG. 4B.
Figure 4C:
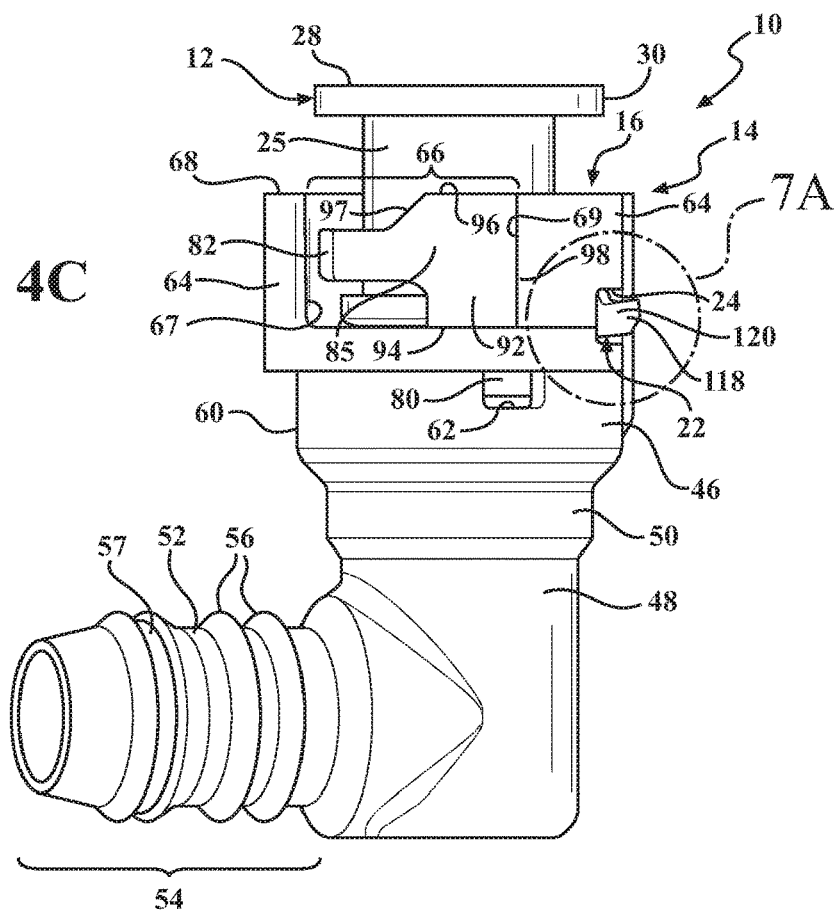
FIG. 4C is a view similar to FIG. 4A with the insertion member of the assembly shown fully inserted therein to a fully assembled position.
Figure 7A:
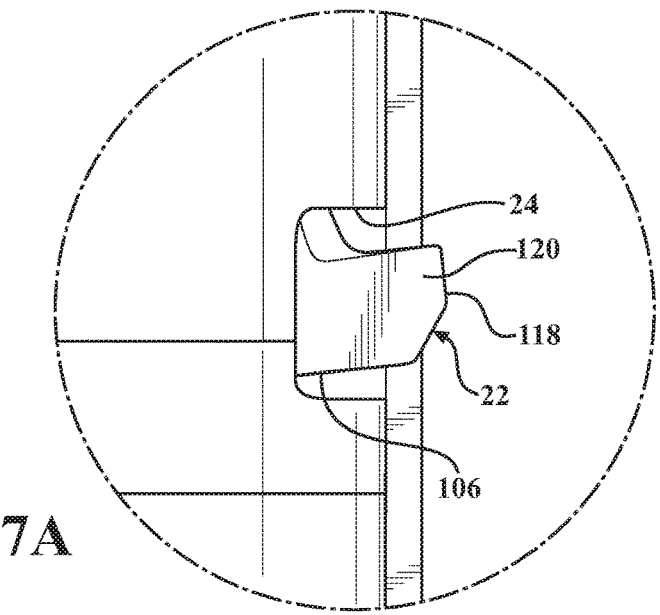
FIG. 7A is an enlarged fragmentary view of the encircled area 7A of FIG. 4C.
Figure 8:
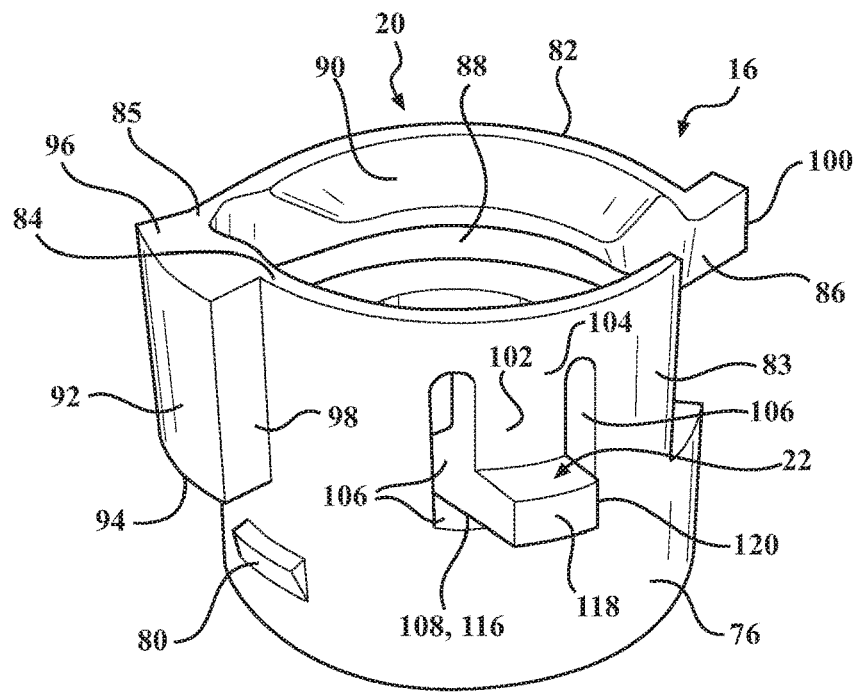
FIG. 8 is a perspective view of a retainer member of the quick connector assembly of FIG. 1.
Figure 9:
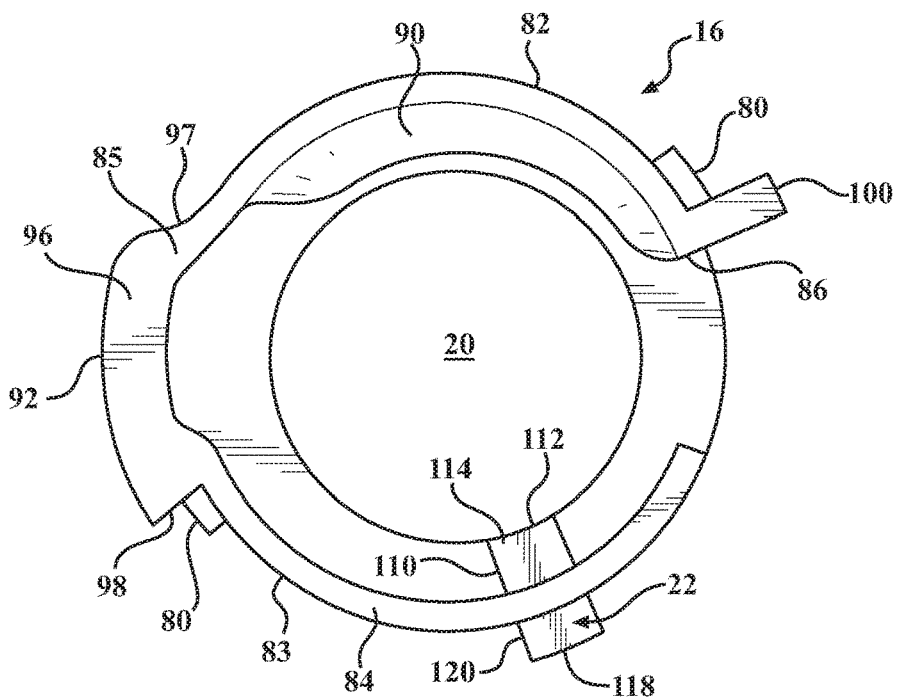
FIG. 9 is a top view of the retainer member of FIG. 8.

The retaining member 16, as best shown in FIGS. 1, 8, and 9, includes a generally tubular, generally cylindrical wall 76 sized for receipt in the bore 18 of the housing 14 and having the through opening 20 sized for close fitting receipt of the shaft portion 25 of the insertion member 12. A corresponding number of detents 80 to the number of locking openings 62 in the housing 14 protrude radially outwardly from the cylindrical wall 76. The detents 80, also referred to as protrusions or locking members, are sized, configured and located for snapping, locking, close fitting receipt within the locking openings 62 upon axially disposing the retaining member 16 in the bore 18 of the housing 14. An arcuate locking arm 82 is integrally formed (formed as a monolithic piece of material) with the cylindrical wall 76 via an arcuate wall segment 83. The wall segment 83 is formed as an axial extension of the cylindrical wall 76, having the same or substantially the same radius of curvature therewith, such as in a molding process, by way of example and without limitation. The wall segment 83 is shown as extending between about 45-180 degrees, though this range can be increased or decreased as needed. The locking arm 82 is hingedly supported by a hinge or hinge-like connection 85 at a proximal end 84 of the wall segment 83. The locking arm 82 arches from the hinge connection 85 in circumferentially extending, cantilevered fashion to a free end 86. The locking arm 82 is axially spaced from cylindrical wall 76 by a circumferentially extending gap 88. The locking arm 82 has a radially inwardly facing, beveled cam edge 90 upon its proximal edge. The locking arm 82 is resiliently flexible to permit selective pivotal radial movement about the hinge connection 85 during assembly and during intended disassembly of the insertion member 12 to and from the housing 14. The hinged connection 85 includes a radially expanded region 92 that extends radially outwardly from the cylindrical wall 76 and wall segment 83. The radially expanded region 92 has a lower distal surface 94, an upper proximal surface 96 forming a portion of the proximal end 84, an axially extending flared shoulder 97 transitioning to the locking arm 82 and an opposite axially extending shoulder 98. The locking arm 82 further includes a finger tab 100 extending radially outwardly from the free end 86.

The visual indicator 22 is formed in the wall segment 83 of the retaining member 16 as a monolithic piece of material therewith. The visual indicator 22 has a body 102 depending from the proximal end 84 of the wall segment 83 in the form of a peninsula, such that the body 102, with the exception a hinged connection 104 to the proximal end 84 is surrounded by a gap 106. The hinged connection 104 provides enhanced resiliency to the visual indicator 22, such that the body 102 is resiliently flexible along a radial direction. The body 102 depends to a free end 108, and has opposed protrusions extending in opposite radial directions therefrom. A detent protrusion, also referred to as cam lobe 110, extends radially inwardly to a radially inwardly facing end 112 that lies along a projected diameter extending about the axis A substantially the same as or slightly greater than the diameter of the shaft portion 25 of the insertion member 12. Accordingly, the outer surface of the shaft portion 25 is free to slide past the end 112 in line-to-line fit or a slight clearance relation therewith. The cam lobe 110 has an upper surface configured as a tapered cam surface 114 that depends from the body 102 radially inwardly toward the central axis A and a generally planar bottom surface 116 that extends from the radially inwardly facing end 112 to a radially outwardly facing end 118 of a visual indicator lobe 120. The radially outwardly facing end 118 has a projected diameter extending about the axis A that is substantially equal to or slightly less than the outer diameter of the extension portion 64.

In assembly, as best shown in FIGS. 5A-5C, with the O-rings 72 and spacer sleeve 74 disposed in the intermediate diameter portion 50, the retainer member 16 is disposed axially into the receiving portion 46 of the housing 14 along the longitudinal central axis A. While disposing the retaining member 16 into the receiving portion 46, the detents 80 are axially aligned with the locking openings 62; the visual indicator lobe 120 is axially aligned with the window 24, and the radially expanded region 92 is axially aligned with the notched region 66. To facilitate inserting the retaining member 16 into the receiving portion 46, the finger tab 100 can be compressed radially inwardly to allow the finger tab 100 to clear the wall of the extension portion 64. To further facilitate inserting the retaining member 16 into the receiving portion 46, an installation tube (not shown), formed having a conical shape, can be used to automatically bias the finger tab 10 radially inwardly until it reaches the location of the slot 70, whereupon the detents 80 move into close fitting, snapped receipt into the respective locking openings 62. With the detents 80 snapped into the respective locking openings 62, the finger tab 100 is automatically aligned with the slot 70, and thus, can be released from its biased state to automatically and resiliently return to its unbiased, uncompressed state such that the finger tab 100 extends, at least in part, through the slot 70 and radially outwardly from the extension portion 64. Further yet, the visual indicator lobe 120 is automatically aligned with the window 24, and the radially expanded region 92 is received in the notched region 66 with the shoulder 98 being in close proximity or abutting the side edge 69 and the flared shoulder 97 being in close proximity or abutting the side edge 67. When fully received in the notched region 66, the distal surface 94 is flush or substantially flush with the free end 68 and proximal surface 96 is in close proximity or flush abutment with the upper end of the cylindrical wall 60.

With the retaining member 16 locked in the housing 14, the insertion member 12 is disposed axially along the axis A into the housing 14. The insertion end 26 of the male insertion member 12 is inserted through the retaining member 16 into the housing 14 until the annular collar 34 engages the beveled cam edge 90 of the locking arm 82 to spring bias the locking arm 82 resiliently and radially outwardly from the male insertion member 12, thus allowing the annular collar 34 to pass axially beyond the locking arm 82 into the gap 88 between the locking arm 82 and cylindrical wall 76 of the retaining member 16 (FIG. 5C). Upon the collar 34 fully clearing and passing beyond the locking arm 82, the locking arm 82 snaps audibly and resiliently radially inwardly to its unbiased or substantially unbiased position above the annular collar 34 to rest against the shaft portion 25 of the male insertion member 12 and substantially against the trailing shoulder 38 of the collar 34. With the locking arm 82 properly positioned above the collar 34 and immediately adjacent the trailing shoulder 38, the insertion member 12 is prevented from moving axially outwardly from the housing 14, and therefore the male insertion member 12 is locked inside the housing 14 with a fluid-tight sealed connection established therebetween.

Figure 7B:
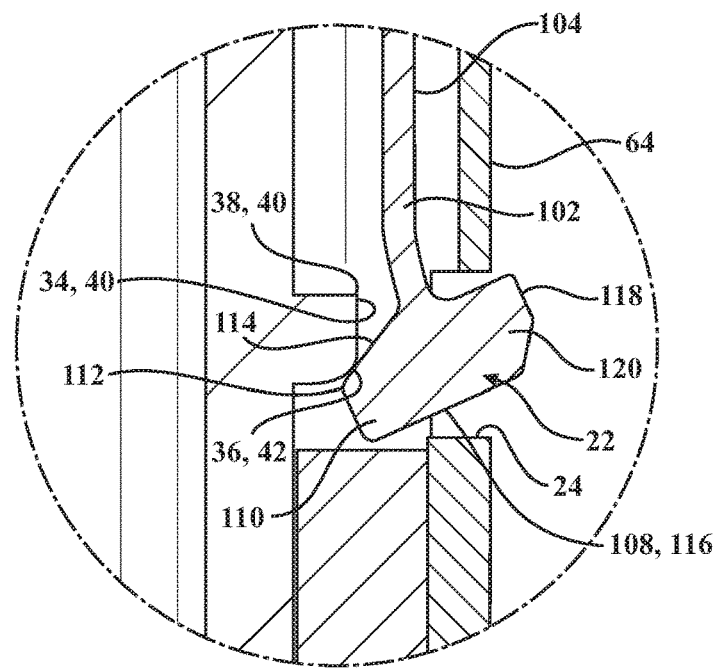
FIG. 7B is an enlarged fragmentary view of the encircled area 7B of FIG. 5C.

As best shown in FIGS. 5C and 7B, with the male insertion member 12 moved to its fully assembled position, the collar 34 is brought into radial alignment or substantial radial alignment with, and engages the cam surface 114 of the cam lobe 110 and causes the cantilevered body 102 to pivot relative to the hinged connection 104 and spring radially outwardly. As such, the visual indicator lobe 120 is automatically pushed into the window 24 and can be configured to extend radially outwardly from the extension portion 64 of the housing 14. With the visual indicator lobe 120 extending radially outwardly from the housing 14, a visual inspection thereof provides assurance that the insertion member 12 is properly and fully inserted and locked in fluid-tight relation within the housing 14. Of course, visual inspection can be performed manually or via automated visual inspection, such as via cameras, sensors or the like. In addition to the visual indication, a physical indication is provided as well, with the presence of the visual indicator lobe 120 extending radially outwardly beyond the extension portion 64. Accordingly, physical sensors could be used in combination with or in lieu of visual inspection to further validate properly assembled inspection status of the assembly 10.

Figure 6B:
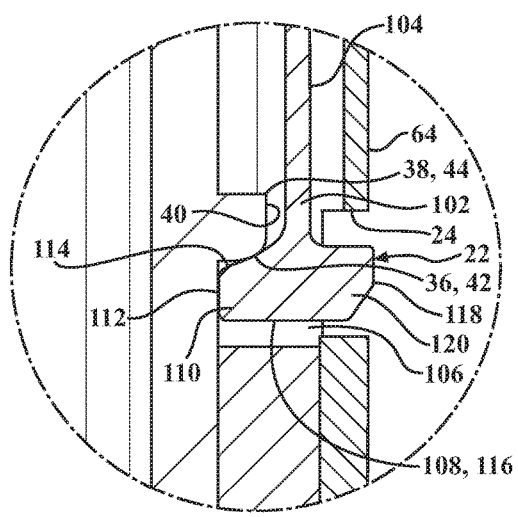
FIG. 6B is an enlarged fragmentary view of the encircled area 6B of FIG. 5B.
Figure 6C:
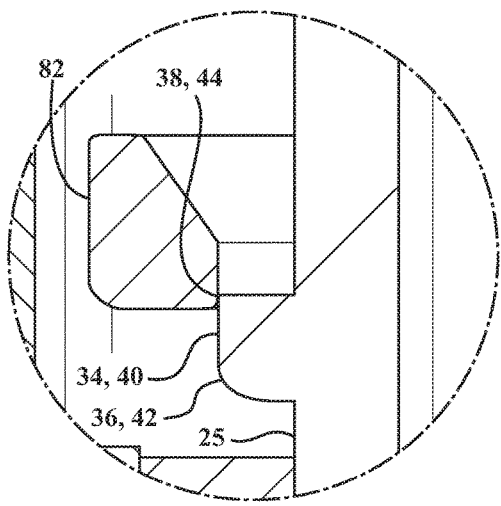
FIG. 6C is an enlarged fragmentary view of the encircled area 6C of FIG. 5B.

If, on the other hand, an incomplete assembly condition exists between the male insertion member 12 and the housing 14, the collar 34 will not be fully received in the gap 88 between the locking arm 82 and cylindrical wall 76, such as shown in FIGS. 5B and 6C. In the less than fully assembled state, the visual indicator 22 and indicator lobe 120 thereof remain substantially unbiased and recessed radially inwardly from the outer surface of the tubular wall 64 of the housing 14 when the collar 34 is not fully received in the gap 88 to indicate an incomplete assembled state between the tubular male insertion member 12 and the housing 14.

When desired, to release the male insertion member 12 from the housing 14, the finger tab 100 can be readily pivoted to radially expand the locking arm 82 away from the annular collar 34 of the male insertion member 12, thereby allowing the male insertion member 12 to be freely removed axially from the retaining member 16 and housing 12. Accordingly, it should be recognized that the assembly 10 is economical in manufacture and use, with no extra tool member or lock-release member being required to establish the connection between the insertion member 12 and the housing 14. Further, benefits are recognized by readily being able to visually determine a proper fluid-tight seal has been established between the male insertion member 12 and the housing 14, such as avoiding shipping incomplete assemblies, such as shown in FIGS. 5B, 6B and 6C, wherein the assembly may have been thought to be complete, but in actuality is not fully assembled.

The foregoing description of the embodiments has been provided for purposes of illustration and description. It is not intended to be exhaustive or to limit the disclosure or claims. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure and claims, wherein the claims ultimately define the scope of the invention.

What is claimed is:

1. A connector assembly for receiving a tubular male insertion member having a radially extending annular collar, comprising:
    a housing having a tubular wall bounding a bore extending along a central longitudinal axis between opposite ends of said housing, said wall having at least one locking opening, a slot, and a window; and
    a retaining member having a cylindrical wall sized for receipt in said bore of said housing, said cylindrical wall having at least one detent extending radially outwardly from said cylindrical wall for receipt in said at least one locking opening, a locking arm cantilevered from said cylindrical wall by a hinge connection allowing pivotal movement of said locking arm radially inwardly and outwardly from said central longitudinal axis, said locking arm being axially spaced from said cylindrical wall by a gap sized for receipt of said collar when the tubular male insertion member is in a fully assembled position relative to said housing, said locking arm being configured for receipt in said slot when said at least one detent is received in said at least one locking opening, and a visual indicator flexibly attached to said cylindrical wall, said visual indicator being moveable from an unbiased position to a radially outwardly biased position away from said central longitudinal axis into said window in response to said collar being fully received in said gap in radially aligned abutment with said visual indicator;
    wherein said visual indicator has an elongate body extending between opposite ends, one end of said body being attached to said retainer member by a hinged connection and the opposite end of said body being attached to a visual indicator lobe, said visual indicator lobe having a cam surface configured for sliding engagement with said collar to facilitate movement of said collar into radially aligned abutment with said visual indicator.

2. The connector assembly of claim 1 wherein at least a portion of said visual indicator lobe extends radially outwardly from said tubular wall of said housing when said collar is in radially aligned abutment with said visual indicator.

3. The connector assembly of claim 2 wherein said visual indicator lobe remains recessed radially inwardly from an outer surface of said tubular wall of said housing when said collar is not fully received in said gap.

4. The connector assembly of claim 1 wherein said elongate body and said indicator lobe are substantially spaced from said cylindrical wall by a gap.

5. The connector assembly of claim 1 wherein said visual indicator lobe remains recessed radially inwardly from an outer surface of said tubular wall of said housing when said collar is not fully received in said gap.

6. The connector assembly of claim 1 wherein said housing has first portion, a second portion and a third portion spaced axially from one another, said third portion extending axially between said first and second portions, said at least one locking opening and said slot being formed in said first portion and said window being formed in said third portion.

7. The connector assembly of claim 6 further including at least one seal member disposed in said second portion, said at least one seal member being adapted for direct sealed abutment with an outer surface of the tubular male insertion member.

8. The connector assembly of claim 7 wherein said first portion extends to a free end of said housing.

9. A connector assembly, comprising:
    a tubular male insertion member having an annular collar;
    a housing having a cylindrical inner wall bounding a bore extending along a central longitudinal axis between opposite ends of said housing, said inner wall having a locking opening, a slot, and a window; and a retaining member having a cylindrical outer wall sized for receipt in said bore of said housing, said outer wall having a detent configured for receipt in said locking opening, a locking arm cantilevered by a hinge connection to allow pivotal movement of said locking arm relative to said central longitudinal axis, and a visual indicator, wherein said locking arm is axially spaced by a gap sized for receipt of said collar when said tubular male insertion member is in a fully assembled position relative to said housing, wherein said locking arm is configured for receipt in said slot when said detent is received in said locking opening, and wherein said visual indicator is flexibly attached to said inner wall for movement from an unbiased position to a radially outwardly biased position relative to said central longitudinal axis so as to be disposed within said window in response to said collar being fully received in said gap in radially aligned abutment with said visual indicator;

wherein said visual indicator has an elongate body extending between opposite ends, wherein one end of said body is attached to said retainer member by a hinged connection and the opposite end of said body is attached to a visual indicator lobe, and wherein said visual indicator lobe has a cam surface configured for sliding engagement with said collar to facilitate movement of said collar into radially aligned abutment with said visual indicator.

10. The connector assembly of claim 9 wherein at least a portion of said visual indicator lobe extends radially outwardly from said housing when said collar is in radially aligned abutment with said visual indicator.

11. The connector assembly of claim 10 wherein said visual indicator lobe remains recessed radially inwardly from an outer surface of said housing when said collar is not fully received in said gap.

12. The connector assembly of claim 9 wherein said visual indicator remains recessed radially inwardly from said wall of said housing when said collar is not fully received in said gap.

13. The connector assembly of claim 9 wherein said housing has first portion, a second portion and a third portion spaced axially from one another, wherein said third portion extends axially between said first and second portions, and wherein said locking opening and said slot are formed in said first portion of said housing and said window is formed in said third portion of said housing.

14. The connector assembly of claim 13 further including a seal member disposed in said second portion, wherein said seal member is adapted for direct sealed abutment with an outer surface of said tubular male insertion member.

15. A connector assembly for receiving a tubular male insertion member having a radially extending annular collar to establish a fluid-tight connection therebetween, comprising:

a housing having a wall bounding a bore extending along a central longitudinal axis, said wall having a locking opening, a slot, and a window; and a retaining member sized for receipt in said bore of said housing, said retaining member having a detent extending radially outwardly for receipt in said locking opening, a locking arm cantilevered for pivotal movement relative to central longitudinal axis, and a visual indicator, wherein said locking arm is configured for receipt of said collar when the tubular male insertion member is located in a fully assembled position relative to said housing, wherein said locking arm is configured for receipt in said slot when said detent is received in said locking opening, and wherein said visual indicator is moveable from an unbiased position to a radially outwardly biased position so as to extend into said window in response to said collar being received in radially aligned abutment with said visual indicator;

wherein said visual indicator is attached to said retainer member by a hinged connection and includes a visual indicator lobe, wherein said visual indicator lobe has a cam surface configured for sliding engagement with said collar to facilitate movement of said collar into radially aligned abutment with said visual indicator.

16. The connector assembly of claim 15 wherein at least a portion of said visual indicator lobe extends radially outwardly from said housing when said collar is in radially aligned abutment with said visual indicator.

17. The connector assembly of claim 16 wherein said visual indicator lobe remains recessed radially inwardly relative to said housing when said collar is not fully received in said gap.

* * * * *